United States Patent
Lin et al.

(10) Patent No.: US 9,182,622 B2
(45) Date of Patent: Nov. 10, 2015

(54) THERMAL CARRIER FOR AN LCOS DISPLAY PANEL AND ASSOCIATED METHODS

(71) Applicant: OmniVision Technologies, Inc., Santa Clara, CA (US)

(72) Inventors: Wei-Feng Lin, HsinChu (TW); Chun-Sheng Fan, HsinChu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 48 days.

(21) Appl. No.: 14/086,703

(22) Filed: Nov. 21, 2013

(65) Prior Publication Data

US 2015/0138483 A1 May 21, 2015

(51) Int. Cl.
*G02F 1/1333* (2006.01)

(52) U.S. Cl.
CPC .... *G02F 1/133382* (2013.01); *G02F 1/133308* (2013.01)

(58) Field of Classification Search
CPC .................. G02F 1/133345; G02F 1/133377
See application file for complete search history.

(56) References Cited

U.S. PATENT DOCUMENTS

| | | | | |
|---|---|---|---|---|
| 7,042,623 | B1 * | 5/2006 | Huibers et al. | 359/291 |
| 7,808,573 | B2 * | 10/2010 | Chen et al. | 349/58 |
| 7,872,338 | B2 * | 1/2011 | Tarn | 257/680 |
| 2004/0232535 | A1 * | 11/2004 | Tarn | 257/680 |
| 2006/0077314 | A1 * | 4/2006 | Li et al. | 349/58 |
| 2006/0082859 | A1 * | 4/2006 | Huibers et al. | 359/291 |
| 2006/0220199 | A1 * | 10/2006 | Duboc et al. | 257/678 |
| 2008/0316416 | A1 * | 12/2008 | Chang et al. | 349/150 |
| 2010/0001943 | A1 * | 1/2010 | Leo et al. | 345/101 |
| 2010/0033654 | A1 * | 2/2010 | Aoki | 349/72 |
| 2011/0255047 | A1 * | 10/2011 | Kim et al. | 349/161 |
| 2014/0211134 | A1 * | 7/2014 | Yang et al. | 349/106 |

OTHER PUBLICATIONS

Guttag, K., et al. "854×600 Pixel LCOS Microdisplay with 5.4uM Pixel Pitch for Pico-Projectors," Syndiant Inc., 2011.
Taiwanese Patent Application 103138113 Office Action dated Sep. 2, 2015, 8 pages.

\* cited by examiner

*Primary Examiner* — James Dudek
(74) *Attorney, Agent, or Firm* — Lathrop & Gage LLP

(57) ABSTRACT

A thermal carrier and method control a temperature of an LCOS display panel. The temperature of the LCOS display panel is determined. Electrical power to a heating element within a thermal carrier carrying the LCOS display panel is increased when the temperature of the LCOS display panel is below a first temperature threshold and electrical power to the heating element is decreased when the temperature of the LCOS display panel is above a second temperature threshold.

11 Claims, 5 Drawing Sheets

THERMAL CARRIER FOR AN LCOS DISPLAY PANEL AND ASSOCIATED METHODS

BACKGROUND

Liquid Crystal on Silicon (LCOS) is a technology commonly used to generate projected images, wherein liquid crystals within a LCOS display panel are controlled to affect reflectivity of lighted impinging onto a pixelated area, such that the reflected light forms a desired image. LCOS devices are becoming popular for use in projection televisions, for example. However, when the temperature is below a predefined temperature (e.g., seventy degrees Celsius), the liquid crystals are slow to respond to electrical changes, and performance (e.g., color rendering) of the LCOS display panel is not optimal. Incorporated herein by reference is a paper titled "854×600 Pixel LCOS Microdisplay with 5.4 uM Pixel Pitch for Pico-Projectors" by K. Guttag, J. Lund, and C. Waller of Syndiant Inc. 18325 Waterview Parkway, Dallas, Tex. 75252, USA which details the problems of LCOS based projection.

US Patent Application Publication Number 2010/0001943, titled "Heating System For Display Panel And Display Panel Using The Same", filed Jul. 7, 2008, incorporated herein by reference, describes a prior art method of heating an LCOS panel wherein a heating element is incorporated into a substrate of the LCOS panel itself. However, positioning the heating element within the silicon substrate of the LCOS panel limits the voltage and power that may be applied to the heating element. For example, using high voltage/current and/or high heat dissipation within the silicon substrate of the LCOS panel may result in electrical interference with display operation and/or thermal damage to the silicon substrate. Thus, the temperature regulation achieved by this design is poor.

SUMMARY OF THE INVENTION

In one embodiment, a method controls a temperature of an LCOS display panel. The temperature of the LCOS display panel is determined. Electrical power to a heating element within a thermal carrier carrying the LCOS display panel is increased when the temperature of the LCOS display panel is below a first temperature threshold and electrical power to the heating element is decreased when the temperature of the LCOS display panel is above a second temperature threshold.

In another embodiment, a thermal carrier carries and heats an LCOS display panel. The thermal carrier includes a carrier for coupling with the LCOS display panel and a heating element positioned within the carrier to thermally couple with the LCOS display panel. Activation of the heating element transfers heat to the LCOS display panel from the thermal carrier.

DETAILED DESCRIPTION OF THE EMBODIMENTS

In a liquid crystal projector, a light source illuminates a liquid crystal display element and an image displayed by the liquid crystal display element is projected onto a screen. The use of liquid crystal technology has advantages including low power consumption, low electromagnetic radiation, and high space utilization.

Liquid crystal on silicon (LCOS) display devices are a well-known reflective type liquid crystal display device for optical projection systems. LCOS display devices include an array of display pixels fabricated on a silicon substrate or other semiconductor substrates with associated control circuitry, and liquid crystal material encapsulated to overlie the display pixel array. When appropriate electrical signals are applied to the various pixels, one or more of transparency, polarization, and reflectivity of the liquid crystal material is altered thereby changing the pixel reflectivity. Even though the LCOS projection system advantageously has small size, high definition display, and high luminance when used with light emitting diodes (LEDs), the display pixels and the illuminator are temperature dependent. Thus, a heating system that quickly regulates the temperature of the LCOS display panel would be beneficial.

Figure 1:
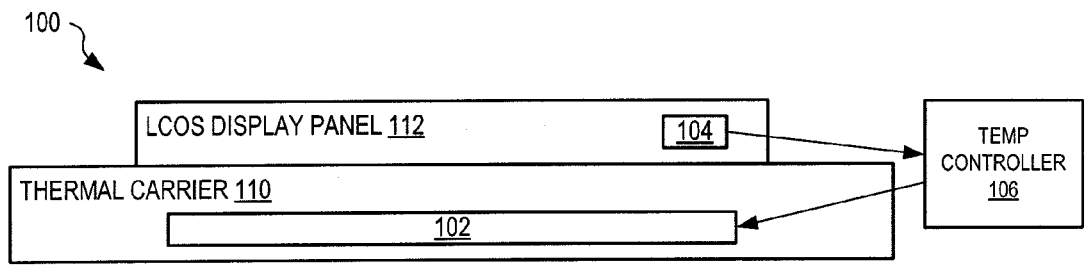
FIG. 1 shows one exemplary thermal carrier for an LCOS display panel, in an embodiment.

FIG. 1 shows one exemplary thermal carrier 110 for an LCOS display panel. Thermal carrier 110 is shown within a heating system 100 that includes a temperature sensor 104 and a temperature controller 106. Thermal carrier 110 includes a heating element 102 that is thermally coupled to an LCOS display panel 112. LCOS display panel 112 represents any LCOS device that potentially benefits from temperature regulation. LCOS display panel 112 has a silicon substrate including associated control circuitry and encapsulated liquid crystals overlying a pixel array that forms the display. LCOS display panel 112 may be formed on other suitable substrates without departing from the scope hereof. Thermal carrier 110 may be configured as any one of a printed circuit board carrier (see PCB thermal carrier 200, FIG. 2), a ceramic leaded chip carrier (see ceramic leaded chip carrier 600, FIGS. 6 and 7), and a flexible print circuit (FPC) carrier (see FPC thermal carrier 400, FIG. 4). Heating element 102 may be combined with other types of carrier to form thermal carrier 110 without departing from the scope hereof.

Temperature sensor 104 may be co-located and/or built into LCOS display panel 112 and includes appropriate connectivity for indicating temperature of LCOS display panel 112 to temperature controller 106. In one example of operation, temperature controller 106 controls power driving heating element 102 based upon temperature values received from temperature sensor 104. Temperature controller 106 may be implemented by one or both of discrete circuitry and software comprising machine readable instructions executed by a processor. In one embodiment, temperature controller 106 is implemented within a field programmable gate array (FPGA). In another embodiment, temperature controller 106 is implemented within a microcontroller. In another embodiment, temperature controller 106 is implemented at least in part within a processor (e.g., a CPU, microcontroller, ASIC, etc.) of a device that drives LCOS display panel 112 and/or heating system 100. In another embodiment, temperature controller 106 is implemented as a single integrated circuit.

Heating element 102 generates heat, under control of temperature controller 106, which is transferred from thermal carrier 110 to LCOS display panel 112 such that liquid crystals within LCOS display panel rapidly achieve and maintain a regulated temperature. Response of liquid crystals to electrical charges improves at seventy degrees Celsius for example, as compared to response of liquid crystals that are colder than seventy degrees Celsius, thus thermal carrier 110 may be configured to heat LCOS display panel 112 to seventy degrees Celsius when LCOS display panel 112 is below seventy degrees Celsius. Incorporating heating element 102 within thermal carrier 110 allows heating element 102 to operate with greater heating power as compared to where the heating element is instead incorporated in a substrate of LCOS panel 112. High heating power, in turn, enables fast heating of LCOS display panel 112, thereby facilitating rapid temperature control of LCOS display panel 112.

Figure 2:
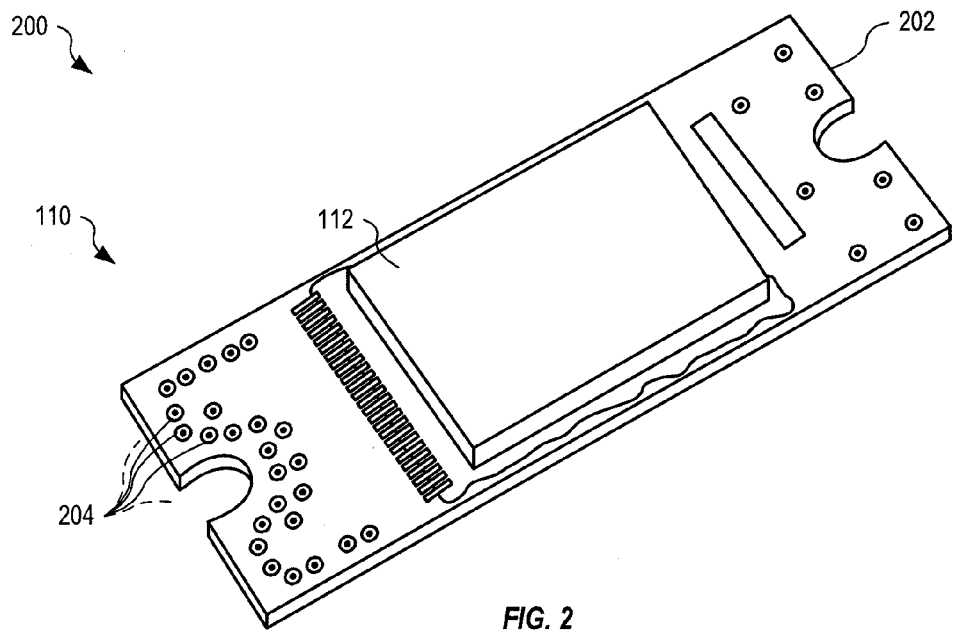
FIG. 2 is a perspective view illustrating exemplary mounting of an LCOS display panel on the thermal carrier of FIG. 1 configured as a printed circuit board (PCB), in an embodiment.
Figure 3:
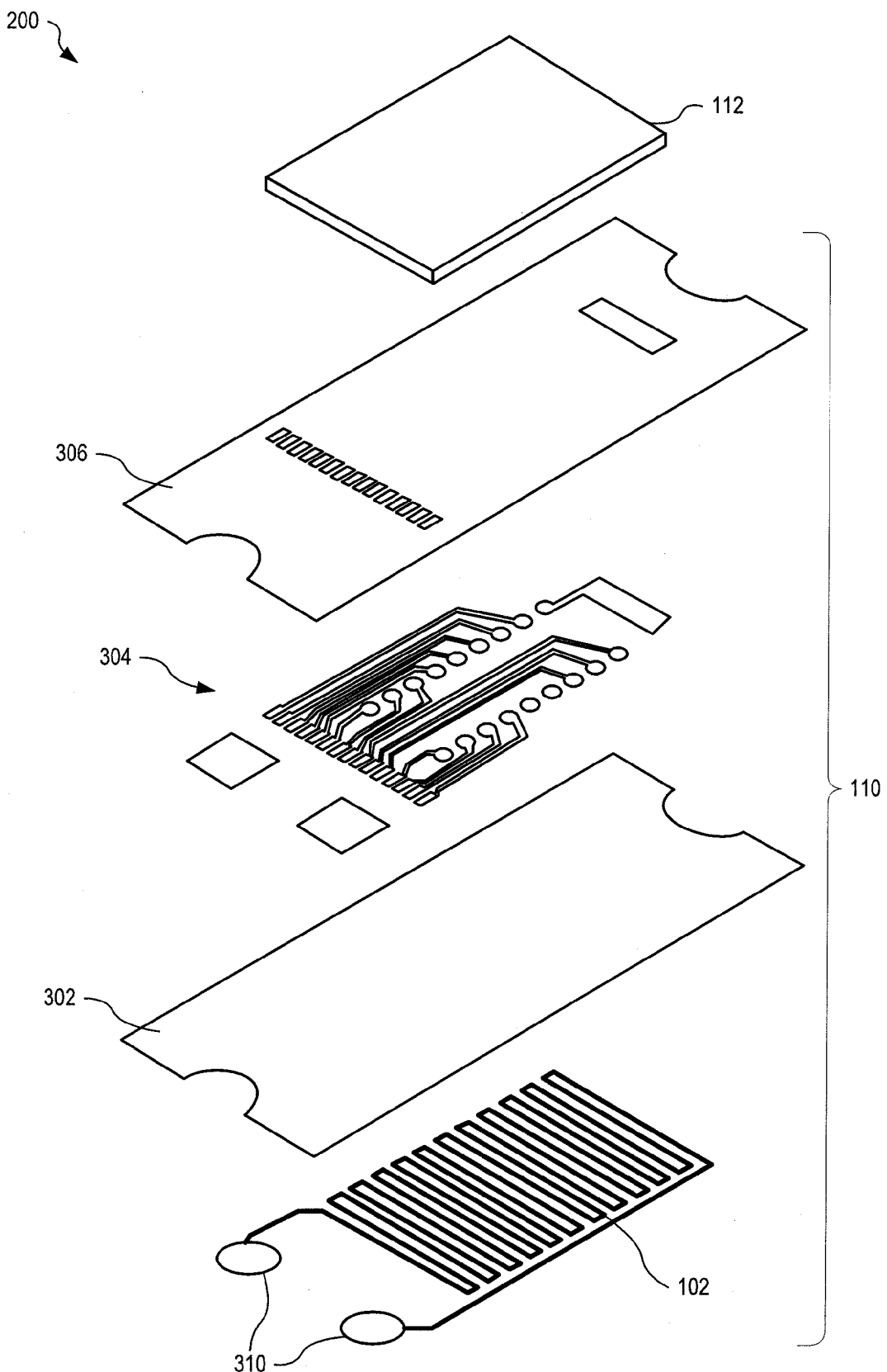
FIG. 3 is an exploded view of the PCB of FIG. 2 showing exemplary configuration of the heating element of FIG. 1.

FIG. 2 is a perspective view illustrating exemplary mounting of LCOS display panel 112 on thermal carrier 110, FIG. 1, configured as a printed circuit board (PCB) thermal carrier 200. FIG. 3 is an exploded view of PCB thermal carrier 200 of FIG. 2 showing exemplary configuration of heating element 102 of FIG. 1 therein. FIGS. 2 and 3 are best viewed together with the following description.

PCB thermal carrier 200 is for example an FR4 PCB that is configured with heating element 102 positioned such that heat generated by heating element 102 is transferred to LCOS display panel 112 when mounted thereto. PCB thermal carrier 200 may include one or more vias 204, as shown, and may include other electronic components that support operation of LCOS display panel 112 for example. PCB thermal carrier 200 includes heating element 102, a first solder resist layer 302, a lead frame 304, and a second solder resist layer 306. Vias 204 and lead frame 304 provide an electrical interface between LCOS display panel 112 and external circuitry to allow the external circuitry to control images on the LCOS display panel for example. Solder resist layers 302, 306, and lead frame 304 represent conventional components of a PCB as known in the art of PCB manufacturer, wherein PCB thermal carrier 200 is manufactured using conventional PCB manufacturing techniques.

In one embodiment, at least part of temperature controller 106 is implemented on PCB thermal carrier 200, thereby simplifying regulation of temperature of LCOS display panel 112.

Heating element 102 is for example a thin-film resistive heating element positioned within PCB thermal carrier 200 such that it is beneath LCOS display panel 112 when coupled to the thermal carrier. Thus, heat generated by heating element 102 when current is passed through heating element 102 is thermally transferred to LCOS display panel 112. As shown, heating element 102 connects to connective pads 310 which allow coupling of heating element 102 to temperature controller 106. Although shown near a top surface of PCB thermal carrier 200, heating element 102 may be positioned on a bottom surface or on a layer therebetween.

Figure 4:
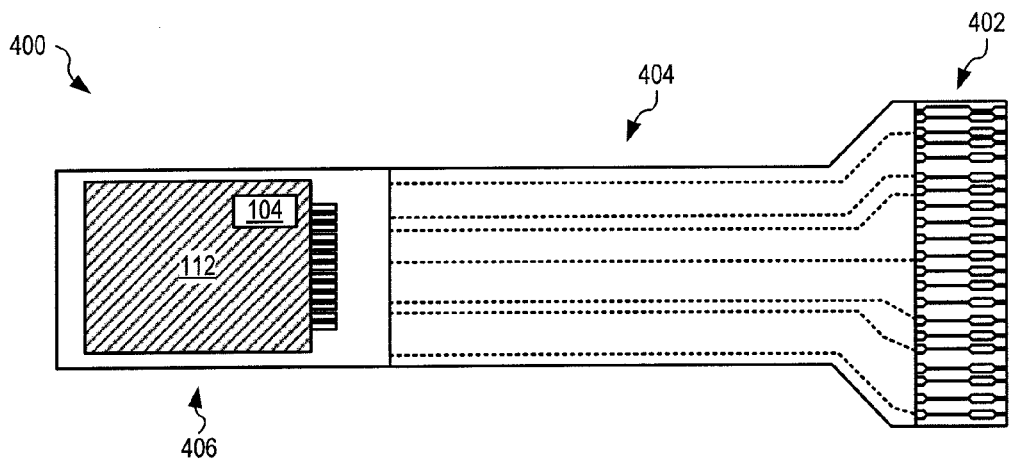
FIG. 4 shows exemplary mounting of an LCOS display panel on the thermal carrier of FIG. 1 configured as a flexible print circuit (FPC) carrier, in an embodiment.
Figure 5:
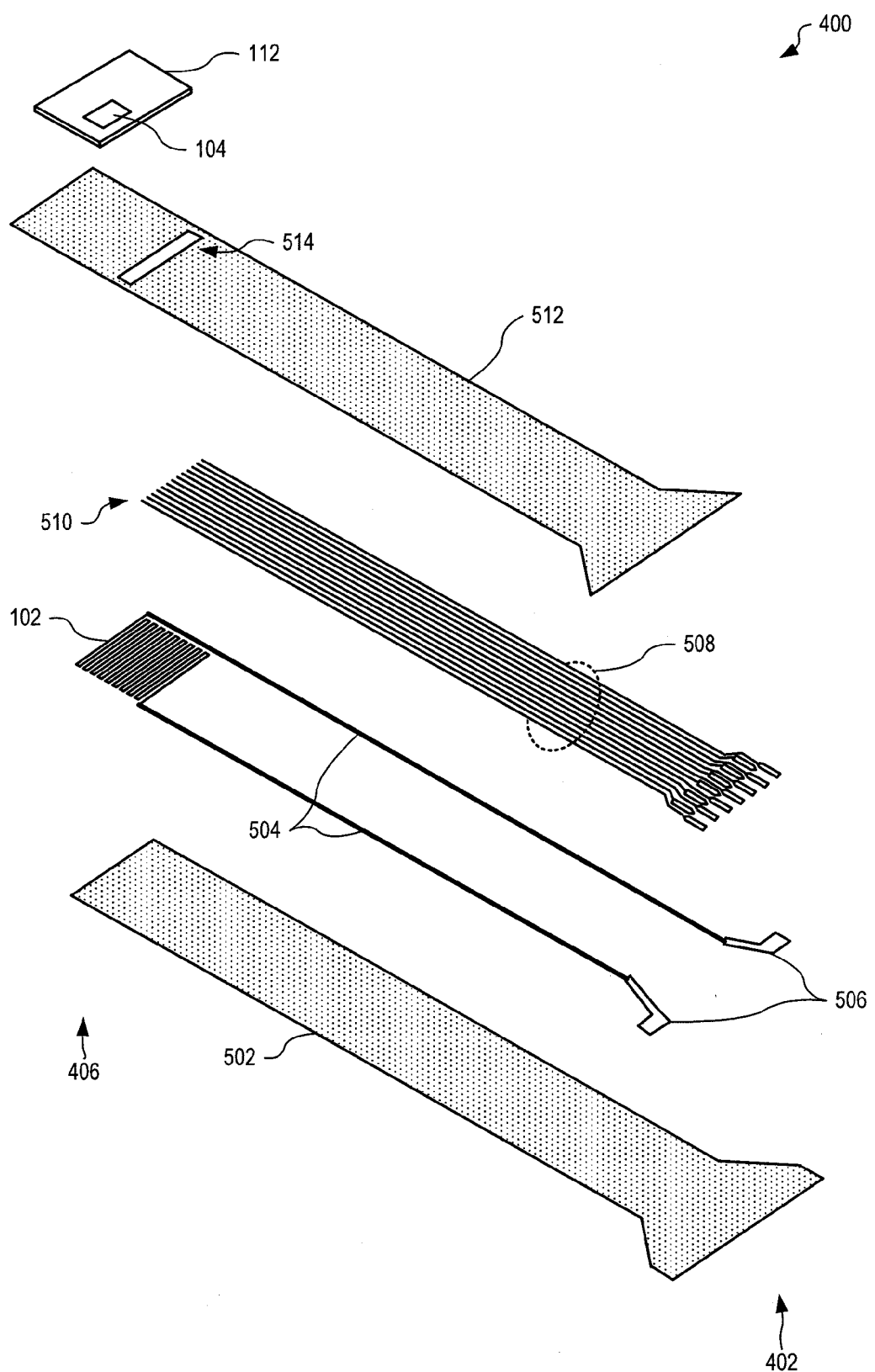
FIG. 5 is an exploded view of the FPC thermal carrier of FIG. 4 showing exemplary configuration of the heating element of FIG. 1.

FIG. 4 is a top view showing exemplary mounting of LCOS display panel 112 on thermal carrier 110, FIG. 1, configured as a flexible print circuit (FPC) thermal carrier 400. FIG. 5 is an exploded view of the FPC thermal carrier of FIG. 4 showing exemplary configuration of heating element 102 of FIG. 1. FIGS. 4 and 5 are best viewed together with the following description.

FPC thermal carrier 400 has a connector portion 402 for connecting to a projecting device that utilizes LCOS display panel 112 for example, a flexible portion 404 and an operational end 406 for coupling with LCOS display panel 112. Flexible portion 404 allows operational end 406 to be positioned as desired for operation of LCOS display panel 112 within the projecting device.

FPC thermal carrier 400 includes a bottom layer 502, a flexible insulator, heating element 102 positioned at operational end 406, connectivity tracks 508 that provide electrical connections between connector portion 402 and operational end 406, and a top layer 512. Top layer 512 includes a flexible insulator with an aperture 514 that allows electrical connectivity to connectivity tracks 508 at end 510. As shown, heating element 102 is positioned at operational end 406 such that when current is passed through heating element 102, heat is generated and transferred to LCOS display panel 112 when attached to operational end 406.

Figure 6:
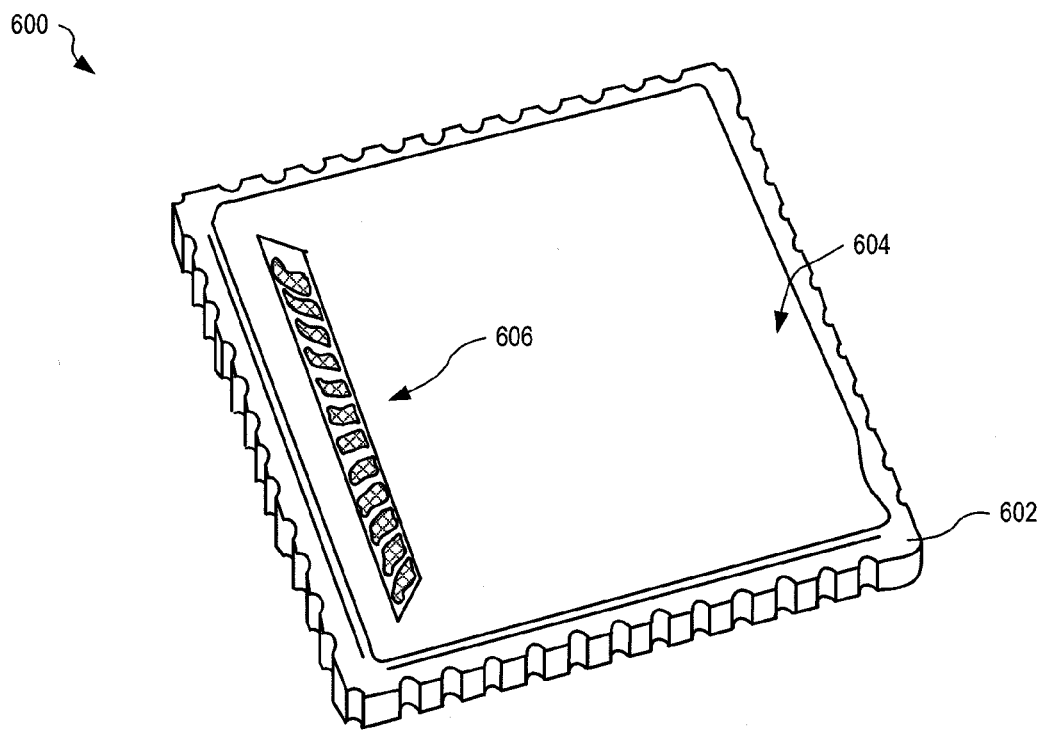
FIGS. 6 and 7 show exemplary mounting of an LCOS display panel on the thermal carrier of FIG. 1 configured as a ceramic leaded chip carrier, in an embodiment.
Figure 7:
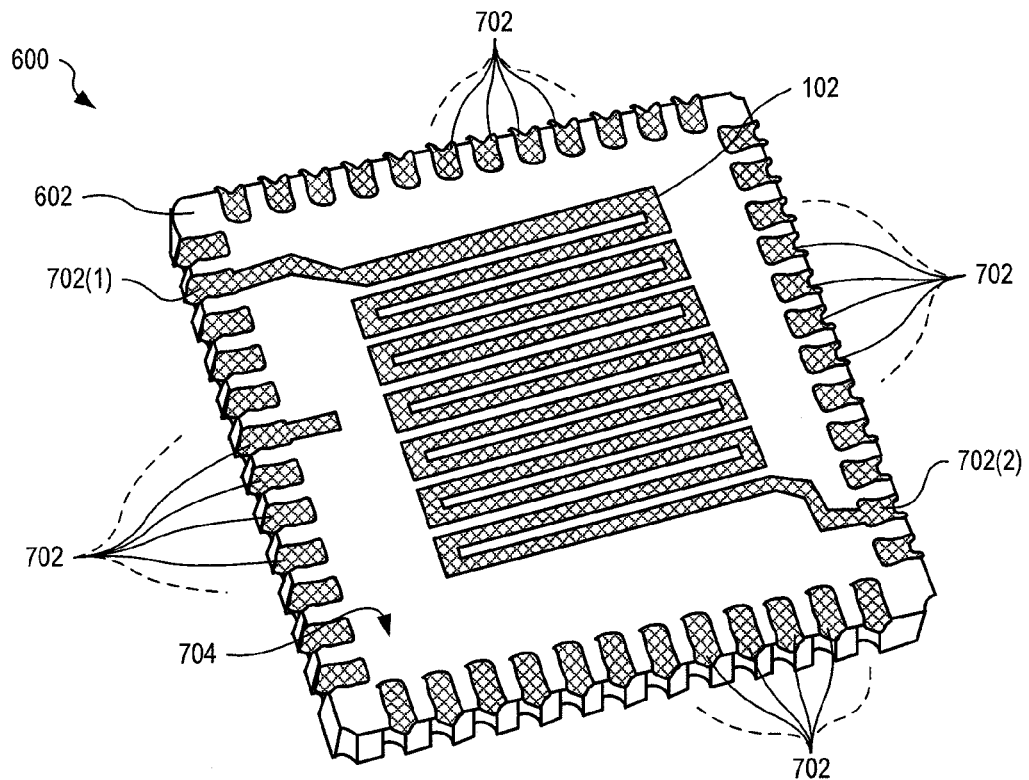

FIGS. 6 and 7 show exemplary mounting of the LCOS display panel 112 on thermal carrier 110, FIG. 1, configured as a ceramic leaded chip carrier 600. Ceramic leaded chip carrier 600 is of a standard size and shape so as to conform to ceramic leaded chip carrier requirements, as known in the art. FIG. 6 is a top perspective view of ceramic leaded chip carrier 600 (with LCOS display panel 112 omitted) and FIG. 7 is a bottom perspective view of ceramic leaded chip carrier 600. Ceramic leaded chip carrier 600 has a ceramic body 602 with a top surface 604, in which is shown exemplary connectors 606 for coupling with LCOS display panel 112. When coupled with ceramic leaded chip carrier 600, LCOS display panel 112 is positioned proximate to top surface 604 and couples to one or more of connectors 606. Ceramic leaded chip carrier 600 has a plurality of connectors 702 formed around an edge of bottom surface 704 that provide external connectivity to connector 606. Heating element 102 is formed on a bottom surface 704 of ceramic body 602 and is electrically coupled to at least a first connector 702(1) and a second connector 702(2) that allow electrical connectivity to heating element 102.

In one example of operation, a current is passed through heating element 102 via connectors 702(1) and 702(2), and heat generated by heating element 102 is transferred through ceramic body 602 to LCOS display panel 112 positioned against top surface 604.

Figure 8:
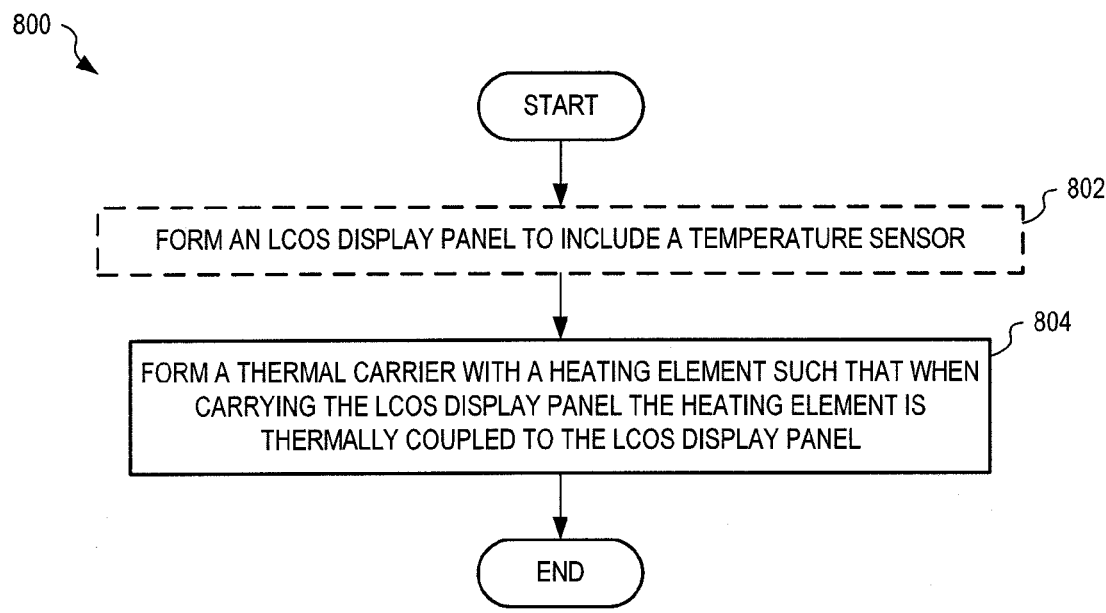
FIG. 8 is a flowchart illustrating one exemplary method for manufacturing the thermal carrier of FIG. 1 with the heating element, in an embodiment.

FIG. 8 is a flowchart illustrating one exemplary method 800 for manufacturing thermal carrier 110 with heating element 102. Step 802 is optional. If included, in step 802, method 800 forms an LCOS display panel to include a temperature sensor. In one example of step 802, LCOS display panel 112 is formed to include temperature sensor 104. In another example of step 802, temperature sensor 104 is added to a previously fabricated LCOS display panel 112. In step 804, method 800 forms a thermal carrier with a heating element such that when carrying the LCOS display panel the heating element is thermally coupled to the LCOS display panel. In one example of step 804, heating element 102 is positioned beneath solder resist layer 302 of PCB thermal carrier 200. In another example of step 804, heating element 102 is positioned at operational end 406 of FPC thermal carrier 400. In another example of step 804, heating element 102 is positioned on a bottom surface of ceramic leaded chip carrier 600 such that heat generated by heating element 102 passes through ceramic body 602 and is transferred to LCOS display panel 112 coupled with carrier 600.

Figure 9:
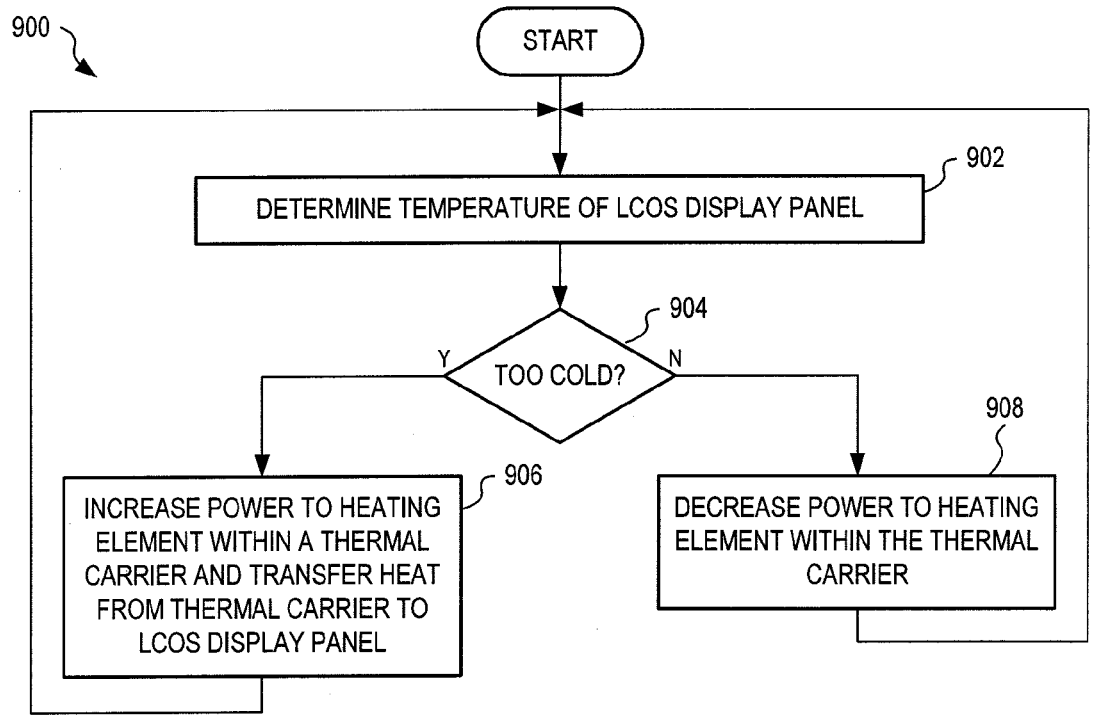
FIG. 9 is a flowchart illustrating one exemplary method for regulating temperature of an LCOS display panel coupled to the thermal carrier of FIG. 1, in an embodiment.

FIG. 9 is a flowchart illustrating one exemplary method 900 for regulating temperature of LCOS display panel 112 using heating element 102 within thermal carrier 110. Method 900 is for example implemented within temperature controller 106.

In step 902, method 900 determines a temperature of a LCOS display panel. In one example of step 902, temperature controller 106 decodes a signal from temperature sensor 104 to determine a temperature of LCOS display panel 112. Step 904 is a decision. If, in step 904, method 900 determines that the temperature of the LCOS display panel is too cold, method 900 continues with step 906; otherwise, method 900 continues with step 908. In one example of decision step 904, temperature controller 106 compares a temperate value determined from temperature sensor 104 with a temperature threshold value of seventy degrees Celsius.

In step 906, method 900 increases power to a heating element within a thermal carrier and transfers heat from the thermal carrier to the LCOS display panel. In one example of step 906, temperature controller 106 increases electrical power passing through heating element 102 positioned within PCB thermal carrier 200 to generate heat that is conducted from PCB thermal carrier 200 to LCOS display panel 112. Method 900 then continues with step 902.

In step 908, method 900 decreases power to the heating element within the thermal carrier. In one example of step 908, temperature controller 106 decreases electrical power passing through heating element 102. Method 900 then continues with step 902.

Steps 902 through 908 repeat to regulate the temperature of the LCOS display panel.

Changes may be made in the above methods and systems without departing from the scope hereof. It should thus be noted that the matter contained in the above description and shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A thermal carrier for carrying and heating an LCOS display panel, comprising:
   a carrier for mounting the LCOS display panel; and
   a heating element positioned within the carrier beneath the LCOS display panel to thermally couple with the LCOS display panel, wherein activation of the heating element transfers heat to the LCOS display panel from the carrier.

2. The thermal carrier of claim 1, comprising a printed circuit board, wherein the heating element is configured with the printed circuit board.

3. The thermal carrier of claim 2, the heating element comprising a thin-film heater formed on one layer of the printed circuit board.

4. The thermal carrier of claim 1, comprising a flex-print-circuit, wherein the heating element is configured within the flex-print-circuit.

5. The thermal carrier of claim 4, the heating element comprising a thin-film heater formed on one layer of the flex-print-circuit.

6. The thermal carrier of claim 1, comprising a ceramic leaded chip carrier, wherein the heating element is configured with the ceramic leaded chip carrier.

7. The thermal carrier of claim 6, the heating element comprising a thin-film heater formed on a bottom surface of the ceramic leaded chip carrier and coupled to at least two connectors of the ceramic leaded chip.

8. The thermal carrier of claim 1, further comprising a temperature sensor positioned with the LCOS display panel for indicating a temperature of the LCOS display panel.

9. The thermal carrier of claim 8, further comprising a temperature controller, communicatively coupled with the temperature sensor and electrically coupled with the heating element, for controlling power supplied to the heating element based upon the temperature of the LCOS display panel.

10. The thermal carrier of claim 9, wherein the temperature controller is implemented at least in part by a processor of a computing device driving the LCOS display panel.

11. The thermal carrier of claim 9, wherein the temperature controller is an electronic circuit for generating a current through the heating element based upon a temperature signal received from the temperature sensor.

* * * * *